United States Patent [19]

Spaanderman et al.

[11] Patent Number: 4,671,429

[45] Date of Patent: Jun. 9, 1987

[54] METHOD AND APPARATUS FOR VOLUMETRIC DOSING VISCOUS PRODUCTS

[75] Inventors: Cornelis Spaanderman; Robert van der Hulst; Abraham W. van Rij, all of Vlaardingen, Netherlands

[73] Assignee: Thomas J. Lipton, Inc., Englewood Cliffs, N.J.

[21] Appl. No.: 670,325

[22] Filed: Nov. 9, 1984

[30] Foreign Application Priority Data

Nov. 15, 1983 [NL] Netherlands ..................... 8303908

[51] Int. Cl.$^4$ ............................................. B67D 5/46
[52] U.S. Cl. ..................... 222/110; 222/278; 222/318; 222/375; 417/517; 417/538
[58] Field of Search ............... 222/110, 109, 318, 424, 222/376, 333, 334, 571, 278, 275, 276, 1, 375; 417/517, 538

[56] References Cited

U.S. PATENT DOCUMENTS

| | | | |
|---|---|---|---|
| 2,413,916 | 1/1947 | Hallead | 222/545 |
| 2,800,365 | 7/1957 | Hodges | 222/318 |
| 2,978,149 | 4/1961 | Rosen | 222/318 |
| 3,739,427 | 6/1973 | Niedecker | |
| 4,023,238 | 5/1977 | Phares | |
| 4,254,806 | 3/1981 | Elsworth | |
| 4,351,354 | 9/1982 | Hitterhaus et al. | 222/318 |

FOREIGN PATENT DOCUMENTS

| | | |
|---|---|---|
| 593429 | 7/1931 | Fed. Rep. of Germany |
| 1350069 | 12/1962 | France |
| 10508 | of 1910 | United Kingdom |
| 724300 | 3/1953 | United Kingdom |

Primary Examiner—Charles A. Marmor
Attorney, Agent, or Firm—Brumbaugh, Graves, Donohue & Raymond

[57] ABSTRACT

A method and apparatus for dosing viscous, aerated material like ice-cream and ice mixes. The method comprises filling a volumetric dosing chamber from a supply, dispensing said amount through a dispensing conduit and returning at least part of the material remaining in said conduit to the supply. The apparatus comprises two preferably coupled three-way valves, the one connecting a dosing chamber with either a supply or a dosing conduit, the other connecting a suction device with either the dosing conduit or the supply.

6 Claims, 3 Drawing Figures

METHOD AND APPARATUS FOR VOLUMETRIC DOSING VISCOUS PRODUCTS

The invention relates to a method for volumetric dosing a viscous product, comprising bringing said product into a volumetric dosing chamber and dispensing it therefrom through a dispensing conduit, and, after the predetermined volume of product has been dispensed through said dispensing conduit and the connection between said conduit and the dosing chamber is cut off, removing at least part of the product still remaining in said dispensing conduit.

U.S. Pat. No. 4.254.806 discloses such a method for dosing viscous material into containers. If such a method is used for volumetric dosing gas-containing products, like aerated ice-cream, the risk is run that an inaccurately defined amount of product and air is sucked back and dispensed again during the next dosing cycle, rendering the dosing inaccurate.

One object of the invention is rendering the method as hereinbefore described more suited for dosing aerated viscous materials like ice cream.

According to the invention the method of the type described above is modified by returning the product which is removed from the dispensing conduit to the supply of product which is used for subsequently filling the dosing chamber.

The amount of product to be removed from the dispensing conduit is of course dependent on the type of product and the dosing circumstances and can be determined in a simple manner.

The invention also relates to an apparatus, for volumetric dosing viscous products comprising a volumetric dosing chamber which is alternatively connectable to a supply reservoir for the product to be dosed and to a dispensing conduit, which dispensing conduit is connectable to a suction device. Such an apparatus is also known from the above US Patent. In order that the method of invention can be used, this apparatus is modified in that the suction device is connectable to the supply reservoir and the dispensing conduit in an alternating manner.

In a preferred embodiment the suction device is connectable to either the supply reservoir or the dispensing conduit by means of a three-way valve and suitable conduits. For simplifying the control of the apparatus this three-way valve is preferably coupled with a three-way valve connecting the dosing chamber with either the dispensing conduit or the supply reservoir.

Preferably both three-way valves are formed by a common housing comprising a bore and four ports opening into said bore, in which bore a core having two channels is rotatable, such that each channel in the core is connecting two successive ports.

In order that a core having an increased strength, pressure fluctuations in the product to be dosed are prevented as far as possible and a small amount of product is to be returned from the apparatus it is to be preferred that the cross section of the channel for filling and emptying the dosing chamber exceeds that of the channel for filling and emptying the suction device.

The invention will now be described in greater detail with reference to the accompanying drawings wherein:

FIG. 1 shows schematically an embodiment of the apparatus of the invention.

Figure 1:
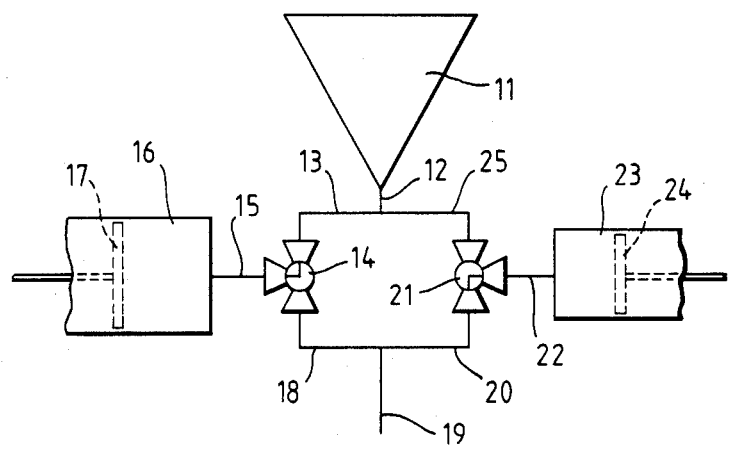
FIG. 1 is a schematic representation of an illustrative embodiment of the apparatus of the instant invention.

A supply conduit 12, 13 connects a supply reservoir 11 with a three-way valve 14, which in the shown position allows the product to be dosed to pass to a conduit 15, opening into a dosing chamber 16 in which a piston 17 is reciprocatable. During its movement to the left as seen in the drawing the chamber 16 is filled with the product to be dosed which is supplied from the supply reservoir 11. Once the required amount of product is separated the three-way valve 14 is rotated such that the product can be pressed out of the chamber 16, through the conduit 15, the three-way valve 14 and a conduit 18 to a dispensing conduit 19 by displacing the piston 17 to the right again. After the dosing chamber 16 has been emptied the three-way valve 14 is put in its original position for filling the dosing chamber and repeating the procedure as described above.

Figure 2:
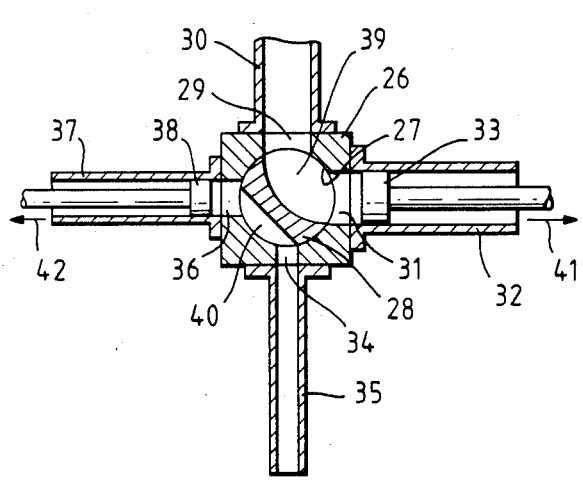
FIG. 2 is a double three-way valve for an apparatus of the invention in a preferred embodiment and FIG. 3 is a detail of the valve according to FIG. 2 in another position.

The product remaining in the conduit 18 and the dispensing conduit 19 is partly sucked away through a suction conduit 20, a second three-way valve 21 which is in the position as shown in FIG. 2 and a conduit 22 into a suction device, comprising a cilinder 23 and a piston 24 reciprocatable therein.

In the period that the product is dispensed from the dosing chamber 16 through the dispensing conduit the product contained in the suction device 23, 24 is returned to the supply reservoir 11 through the conduit 22, the suitably adjusted three-way valve 21, a return conduit 25 and the supply conduit 12 by moving the piston 24 to the left again.

For an easy operation it is advisable to have the three-way valves 14 and 21 coupled and that such that if the supply reservoir 11 is connected with the dosing chamber 16 the dispensing conduit 19 is connected with the suction device 23, 24 and in the other position if the suction device 23, 24 is connected with the supply reservoir 11 the dispensing conduit 19 is connected with the dosing chamber 16.

Figure 3:
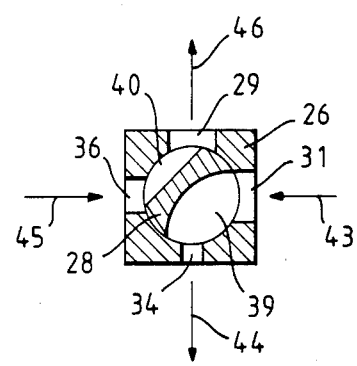

In FIGS. 2 and 3 a preferred embodiment of the apparatus of the invention is shown in detail. This embodiment has the advantage of a simple and compact construction while it is easy to be cleaned. The two three-way valves 14 and 21 as schematically shown in FIG. 1 are combined as one construction in this embodiment, comprising a common housing 26 having a bore 27 in which a core 28 is rotatably mounted. The housing is provided with four ports which radially extend with respect to the bore and are about 90° apart from each other and consequently evenly distributed around the core 28. One port 29 is connected with a supply 30, the next port 31 is connected with a dosing chamber 32 in which a piston 33 is mounted for reciprocation, a next port 34 is connected with a dispensing conduit 35 and the port 36 next to that is connected with a suction device, comprising a cilinder 37 in which a piston 38 is reciprocatable. The core 28 which is rotatably mounted in the bore 27 is provided with about segment-shaped channels 39, 40 which are arranged in such a manner that each two successive ports can be connected thereby. The channel for connecting either the ports 29 and 31 (see FIG. 2) or the ports 31 and 34 (see FIG. 3) preferably has the largest cross-section and is shaped such that a flowing connection between ports 29 and 31 is formed. The other channel 40 may have a smaller cross-section thereby maintaining more material in the core for an increased strength.

In the position as shown in FIG. 2 a displacement of the piston 33 in the dosing chamber 32 to the right in the direction of the arrow 41 fills the dosing chamber with product. Simultaneously a displacement of the piston 38 in the suction cilinder 37 to the left in the direction of the arrow 42 will remove product from the dispensing conduit 35 by suction. By rotating the core 28 into the position as shown in FIG. 3 the product from the dosing chamber 32 can be dispensed through the port 31, the channel 39, the port 34 and the dispensing conduit 35 in the direction of the arrows 43 and 44. This proceeds under the influence of the displacement of the piston 33 to the left. Simultaneously the displacement of the piston 38 to the right causes the product sucked out of the dispensing conduit to flow from the suction cilinder 37 through the port 36, the smaller channel 40 and the port 29 to the supply conduit 30 in the direction of the arrows 45 and 46. After rotating the core 28 in the position as shown in FIG. 2 again the cycle as described above can be repeated.

We claim:

1. Apparatus for volumetric dosing of viscous products comprising
   a volumetric dosing chamber which is alternatively connectable to
   a supply reservoir for the product to be dosed, and
   a dispensing conduit, which dispensing conduit is connectable to a suction device, said suction device being connectable to the supply reservoir and the dispensing conduit in an alternating manner, but not being connectable to the dosing chamber.

2. Apparatus according to claim 1, characterized in that the suction device is connectable to either the supply reservoir or the dispensing conduit by means of a three-way valve and suitable conduits.

3. Apparatus for volumetric dosing of viscous products comprising a volumetric dosing chamber which is alternatively connectable to a supply reservoir for the product to be dosed and to a dispensing conduit, which dispensing conduit is connectable to a suction device, said suction device being connectable to either the supply reservoir or the dispensing conduit in an alternating manner by means of a three-way valve and suitable conduits, wherein the three-way valve connecting the suction device with either the supply reservoir or the dispensing conduit is coupled with a three-way valve connecting the dosing chamber with either the dispensing conduit or the supply reservoir.

4. Apparatus according to claim 3, characterized in that the three-way valves are formed by a common housing comprising a bore and four ports opening into said bore, in which bore a core having two channels is rotatable, such that each channel in the core is connecting two successive ports.

5. Apparatus according to claim 4, characterized in that the cross-section of the channel for filling and emptying the dosing chamber exceeds that of the channel for filling and emptying the suction device.

6. A method for volumetric dosing of a viscous product comprising
   (a) introducing said product from a supply reservoir into a volumetric dosing chamber;
   (b) dispensing the product from the dosing chamber through a dispensing conduit until some predetermined volume of product has been dispensed, a portion of said dispensed product remaining in the dispensing conduit;
   (c) closing the connection between the dosing chamber and the dispensing conduit; and
   (d) returning the product remaining in the dispensing conduit to the supply reservoir using a suction device which is alternatively connectable to the dispensing conduit and the supply reservoir, but is not connectable to the dosing chamber.

* * * * *